(12) United States Patent
Usoro

(10) Patent No.: US 7,753,147 B2
(45) Date of Patent: Jul. 13, 2010

(54) VEHICLE DRIVE SYSTEM, POWER MANAGEMENT DEVICE, AND METHOD FOR MANAGING POWER

(75) Inventor: Patrick B. Usoro, Troy, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 497 days.

(21) Appl. No.: 11/669,229

(22) Filed: Jan. 31, 2007

(65) Prior Publication Data

US 2008/0179119 A1   Jul. 31, 2008

(51) Int. Cl.
B60L 11/00 (2006.01)
(52) U.S. Cl. ................................. 180/53.8; 180/65.27
(58) Field of Classification Search ............... 180/53.8, 180/65.27
See application file for complete search history.

(56) References Cited

U.S. PATENT DOCUMENTS

| | | | | |
|---|---|---|---|---|
| 5,558,173 | A * | 9/1996 | Sherman | 180/53.8 |
| 5,635,805 | A * | 6/1997 | Ibaraki et al. | 318/139 |
| 5,669,842 | A * | 9/1997 | Schmidt | 475/5 |
| 6,269,895 | B1 * | 8/2001 | Tanuguchi et al. | 180/65.25 |
| 6,307,277 | B1 | 10/2001 | Tamai et al. | |
| 6,726,592 | B2 | 4/2004 | Kotani | |
| 6,801,842 | B2 * | 10/2004 | Egami et al. | 701/36 |
| 6,863,139 | B2 * | 3/2005 | Egami et al. | 180/53.8 |
| 7,174,977 | B2 * | 2/2007 | Enjoji et al. | 180/65.1 |
| 7,282,003 | B2 * | 10/2007 | Klemen et al. | 475/5 |
| 7,399,255 | B1 * | 7/2008 | Johnson et al. | 477/42 |
| 7,473,206 | B2 * | 1/2009 | Obayashi et al. | 477/107 |
| 7,547,264 | B2 * | 6/2009 | Usoro | 475/5 |
| 2002/0179347 | A1 | 12/2002 | Tamai et al. | |
| 2005/0090365 | A1 | 4/2005 | Tamai et al. | |
| 2005/0107198 | A1 | 5/2005 | Sowul et al. | |
| 2006/0017290 | A1 | 1/2006 | Murty et al. | |
| 2006/0091730 | A1 * | 5/2006 | Chiao | 307/10.1 |
| 2007/0080008 | A1 * | 4/2007 | Chiao | 180/65.3 |
| 2007/0103002 | A1 * | 5/2007 | Chiao et al. | 307/10.1 |
| 2007/0163818 | A1 * | 7/2007 | Usoro | 180/65.2 |
| 2007/0209849 | A1 * | 9/2007 | Usoro | 180/65.2 |
| 2007/0213151 | A1 * | 9/2007 | Usoro | 474/87 |

(Continued)

FOREIGN PATENT DOCUMENTS

| | | |
|---|---|---|
| DE | 19849886 A1 | 5/2000 |
| DE | 10357608 A1 | 7/2005 |
| EP | 1405749 A2 | 4/2004 |

*Primary Examiner*—Jeffrey J Restifo

(57) ABSTRACT

A power distribution system for a hybrid vehicle having an engine is disclosed. The power distribution system includes an electric motor/generator, a vehicle accessory drive system comprising a first accessory, and a power distribution apparatus. The power distribution apparatus includes a first power transfer member comprising a first shaft, the first shaft being configured to transfer power to the engine and from the engine. The power distribution apparatus further includes a second power transfer member comprising a second shaft, the second shaft being configured to transfer power to the motor/generator and from the motor/generator. The power distribution apparatus further includes a third power transfer member comprising a third shaft, the third shaft being configured to transfer power to the accessory drive system to drive the first accessory. The power distribution apparatus further includes a first clutch and a second clutch.

18 Claims, 7 Drawing Sheets

U.S. PATENT DOCUMENTS

| | | | |
|---|---|---|---|
| 2008/0020875 A1* | 1/2008 | Serrels et al. | 474/70 |
| 2008/0039263 A1* | 2/2008 | Usoro | 475/157 |
| 2008/0051242 A1* | 2/2008 | Usoro | 475/5 |
| 2008/0099256 A1* | 5/2008 | Holmes et al. | 180/65.2 |
| 2008/0179119 A1* | 7/2008 | Grenn et al. | 180/65.2 |
| 2008/0228351 A1* | 9/2008 | Mc Gee | 701/36 |
| 2009/0098976 A1* | 4/2009 | Usoro et al. | 477/5 |
| 2009/0255741 A1* | 10/2009 | Major et al. | 180/65.22 |

* cited by examiner

VEHICLE DRIVE SYSTEM, POWER MANAGEMENT DEVICE, AND METHOD FOR MANAGING POWER

TECHNICAL FIELD

The present disclosure relates to a vehicle power distribution system and more particularly to a vehicle power distribution system for transferring power among an engine, a motor/generator, and an accessory drive system.

BACKGROUND OF THE INVENTION

Current vehicles utilize accessory drive systems to supply power to vehicle accessories (e.g., air conditioner systems, power steering systems, power braking, alternators, and pumps (e.g., oil, coolant and the like). The accessory drive system includes a belt coupled to the engine through one or more pulleys. A problem associated with current vehicles is that power is not transferred to the accessories as efficiently as desired. Current accessory drive systems deliver sufficient power to operate accessories over the entire range of the engine's operational speeds. Engines can operate at speeds from, for example, 500 RPM (revolutions per minute) to 8000 RPM, and the pulleys of the accessory drive systems operate at speeds that are directly proportional to the engine speed. In order to deliver sufficient power to the vehicle accessories over the entire range of operational engine speeds, a fixed ratio of engine speed to accessory drive system pulley speed is selected such that the accessory drive system can distribute sufficient power to operate the accessories at the lowest engine speeds. However, by selecting the ratio so that the engine supplies sufficient power to operate the accessories at the lowest engine speeds, the engine is configured to supply excess power to the accessories at higher engine speeds, and the excess energy is thereby dissipated by the vehicle.

In current hybrid vehicles, the engine shuts down under selected conditions (e.g., when the vehicle is braking or when the vehicle is at rest) to reduce the engine's fuel consumption. The hybrid vehicles utilize electric motors to power accessories when the engine is shut down. A problem associated with current hybrid vehicles is that the electric motors utilized to power the accessories under all operating conditions. This is inefficient because of the low round-trip efficiency of converting mechanical energy from the engine to electrical energy, storing the electrical energy in the battery as chemical energy, converting the chemical energy from the battery to electrical energy then back to mechanical energy to drive the accessories. Additionally, this approach increases the vehicle costs over vehicles having power distribution systems that power accessories by directly transferring rotational power generated by the engine.

Therefore, a power distribution system that can more efficiently distribute power to vehicle accessories and can reduce vehicle costs is needed.

SUMMARY OF THE INVENTION

A power distribution system for a hybrid vehicle having an engine in accordance with exemplary embodiments of the disclosure is disclosed herein. The power distribution system includes an electric motor/generator, a vehicle accessory drive system comprising a first accessory, and a power distribution apparatus. The power distribution apparatus is in operable communication with the engine, the electric motor/generator, and the vehicle accessory drive system. The power distribution apparatus includes a first power transfer member comprising a first shaft, the first shaft being configured to transfer power to the engine and from the engine. The power distribution apparatus further includes a second power transfer member comprising a second shaft, the second shaft being configured to transfer power to the motor/generator and from the motor/generator. The power distribution apparatus further includes a third power transfer member comprising a third shaft, the third shaft being configured to transfer power to the accessory drive system to drive the first accessory. The power distribution apparatus further includes a first clutch configured to rotationally couple any two of the first shaft, the second shaft, and the third shaft. The power distribution apparatus further includes a second clutch disposed between the first power transfer member and rotationally stationary housing. The electric motor/generator, the engine, or a combination of the electric motor/generator and the engine, can supply power through the power distribution apparatus to the accessory. The third shaft of the power distribution apparatus is configured to operate at a predetermined velocity, wherein the predetermined velocity is independent of the engine velocity.

A method for operating a shaft driving a vehicle accessory drive system at a predetermined velocity according to exemplary embodiments of the disclosure is disclosed herein. The method includes determining an input power level for operating the vehicle accessory drive system. The method further includes determining an engine output power level available for operating the vehicle accessory drive system. If the vehicle accessory drive system input power level is greater than the engine output power level, then the method includes determining a motoring power level for operating the motor/generator. If the vehicle accessory drive system input power level is less than the engine output power level, then the method includes determining a generating power level for operating the motor/generator.

DESCRIPTION OF THE PREFERRED EMBODIMENT

A power distribution system for a hybrid vehicle in accordance with exemplary embodiments will now be described. The power distribution system includes a power distribution apparatus. The power distribution apparatus includes an engine power transfer member, a motor/generator power transfer member, and an accessory power transfer member.

Each power transfer member is configured to communicate with the other power transfer members to transfer selected amounts of power in a vehicle during various operating conditions of the vehicle. Specifically, each power transfer member is configured to transfer rotational power. The term rotational power is meant to include any power generated by the rotational movement of a device (i.e., power comprising a torque and an angular velocity). Therefore, the power transfer member can include any member capable of transferring such power.

In an exemplary embodiment, the power transfer members will comprise shafts communicating through one or more gears. However, in alternative exemplary embodiments the shafts can communicate with each other through rollers, sprockets, pulleys, wheels and the like. The power transfer members can communicate directly, for example, the power transfer members can transfer power through frictional contact or through the meshing of gears. Further, the power transfer members can communicate through an intermediate member, for example, through chains, pulleys, and the like. Further, each power transfer member can communicate through fields, for example, through magnetic fields and the like. Still further, each power transfer member can communicate through fluidic couplings.

The engine power transfer member includes a first shaft. The first shaft is configured to transfer power to the engine and from the engine. The motor/generator power transfer member includes a second shaft. The second shaft is configured to transfer power to the motor/generator and from the motor/generator. The accessory power transfer member includes a third shaft. The third shaft is configured to transfer power to drive the accessory drive system.

The power distribution apparatus is configured to transfer power at a predetermined velocity to the vehicle accessory drive system independent of the engine velocity. The power distribution system can transfer power at the predetermined velocity to the vehicle accessories when the engine is off, or when the engine is operating at any operational speed (e.g., at operational speeds of from 0 to 8,000 RPM.) Further, the power distribution system can transfer power to the motor/generator and the motor/generator can store power in batteries for future use.

The power distribution system can have several configurations selected for various operating conditions. The power transfer members, accessories, and motor/generator can be disposed separately from the engine to reduce overall engine length, and thereby reduce an amount of engine compartment space.

Figure 1:
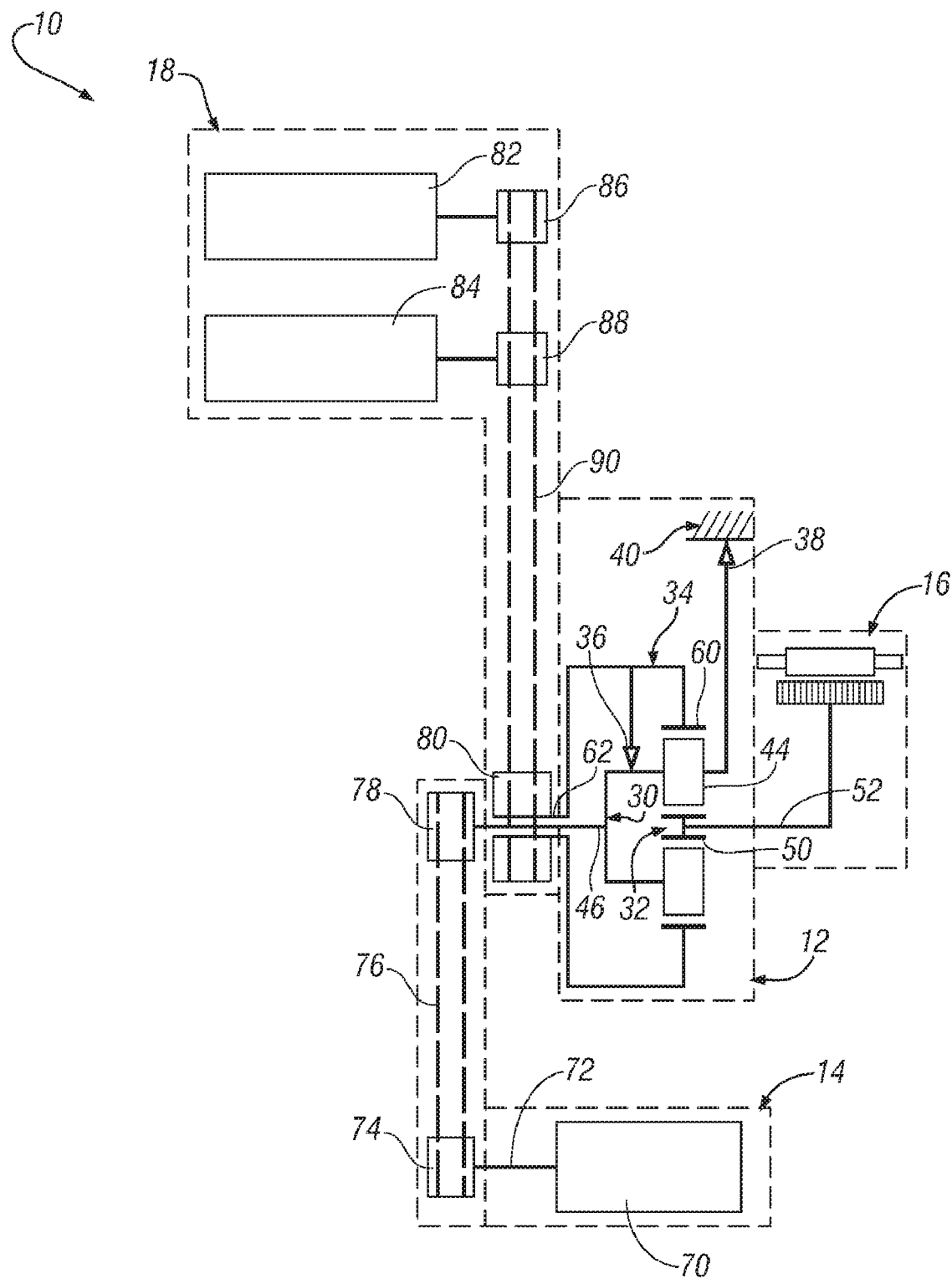
FIG. 1 is a schematic representation of a power transfer system in accordance with an exemplary embodiment of the disclosure.

Referring to FIG. 1, an exemplary power distribution system 10 is shown. The system 10 includes a power distribution apparatus 12, an engine drive system 14, an electric motor/generator 16, and an accessory drive system 18.

The power distribution apparatus 12 is provided to selectively transfer power between the engine drive system 14, the motor/generator 16, and the accessory drive system 18. The power distribution apparatus 12 includes an engine power transfer member 30, a motor/generator power transfer member 32, an accessory power transfer member 34, a clutch 36 (also, referred to herein as a first clutch), a one-way clutch 38 (also, referred to herein as a second clutch), and a casing 40.

The engine power transfer member 30 comprises a plurality of planet gears 44, and a carrier shaft 46. The carrier shaft 46 comprises a center shaft with arm members extending therefrom. The planet gears 44 are rotatably coupled to the arm member such that the each planet gear comprises an axis offset from an axis of the carrier shaft. The planet gears are "rotatably coupled" such that the planet gears can rotate independently of the carrier shaft thereby allowing each planet gear to rotate on its own axis, while allowing the carrier shaft to rotate around the axis of the carrier shaft.

The motor/generator power transfer member 32 comprises a sun gear 50 and a sun gear shaft 52. The sun gear 50 is continuously coupled to the sun gear shaft 52. As used herein, the term "continuously" coupled refers to the coupling of members wherein the members have the same rotational velocity during operation.

The accessory power transfer member 34 comprises a ring gear 60 and a ring gear shaft 62. The ring gear 60 is continuously coupled to the ring gear shaft 62, such that the ring gear shaft 62 rotates along with the ring gear 60.

The clutch 36 is configured to selectively lock the ring gear shaft 62 and carrier shaft 46. When the clutch 36 is engaged, the ring gear shaft 62 and the carrier shaft 46 are rotationally locked. Rotationally locked as used herein is used to denote locking such that the gears rotate at the same velocity. Further, the sun gear shaft will also operate at the same rotational velocity as the ring gear shaft 62 and carrier shaft 46 when clutch 36 is engaged. In alternative exemplary embodiments, a clutch can rotationally lock any two of the three shafts or all three shafts, wherein locking at least two of the shafts will cause all three shafts to rotate at the same velocity (i.e., the speed ratio between the ring gear shaft, the carrier shaft, and the sun gear shaft is 1:1:1.) When the clutch is not engaged, the relative speeds of the ring, carrier and sun shafts depend on the ring gear to sun gar tooth ratios as well known to those skilled in the art. Ring gear to sun gear tooth ratios are typically in the range of 1.5:1 to 3.0:1 Further, additional gears, pulleys, or torque conversion members can be disposed in various locations in the power distribution system 12 to provide selected torque levels between the components of the system 12. The final torque transfer ratio is a function of the gear teeth ratios among the ring, planetary and sun gears and any additional ratios due to gears, pulleys, etc. in accordance with well known relationships.

One-way clutch 38 allows the rotation of the carrier shaft 46 in a second direction, while preventing the rotation of the carrier shaft 46 in a first direction by grounding the carrier to case 40. The one-way clutch 38 thereby only allows a crankshaft 72 of the engine drive system to rotate in the second direction, while preventing rotation of crankshaft 72 in the first direction. Although clutch 38 is described as a "one-way" clutch it is to be understood that in alternative exemplary embodiments, clutch 38 could also be a two-way clutch, wherein the two-way clutch can selectively engage or disengage the carrier shaft 46 during selected operating conditions to prevent the rotation of the carrier shaft 46.

The engine drive system 14 is provided to generate rotational power from a series of internal combustion reactions. The engine drive system comprises an internal combustion engine 70, the crankshaft 72, a crankshaft pulley 74, a belt 76, and an engine drive pulley 78.

The engine 70 can generate selected power levels to provide sufficient power to operate the vehicle under various speeds and operating conditions. Further, the vehicle can shut off the engine under selected operating conditions to manage fuel, emissions or noise. In particular, the vehicle can shut off the engine when the vehicle is decelerating or when the vehicle is stopped. In an exemplary embodiment, the engine 14 is a gasoline engine. In alternative exemplary embodiments, systems can include engines that can utilize other fuels. For example, the engine can be a diesel engine or an engine configured to run on alternative fuels (e.g., ethanol, other hydrocarbons, and the like.) The engine is operably coupled to the crankshaft 72. The crankshaft 72 is configured to rotate in response to expanding gases in combustion chambers of the engine.

The crankshaft pulley 74 is coupled to the crankshaft 72 such that the crankshaft pulley 74 rotates along with the crankshaft 72. Engine drive pulley 78 is connected to the carrier shaft 46 such that the drive pulley 78 rotates along with the carrier shaft 46.

The engine drive pulley 78 is connected to the crankshaft pulley 74 through the belt 76 such that rotational power can be transferred between the crank shaft pulley and the engine drive pulley.

The motor/generator 16 is configured to operate in a motoring mode and in a generating mode. When the motor/generator 16 is operated in the motoring mode, the electrical energy stored, for example, in batteries (not shown) is converted by the motor/generator into rotational mechanical energy which is provided to the sun gear shaft 52. When the motor/generator 16 is operated in the generating mode, rotational energy provided by the sun gear shaft 52 is converted into electrical energy which can be stored in the batteries for future use.

A controller (not shown) is electrically coupled to the motor/generator 16. The controller can be any device that can provide a means used to establish whether the motor/generator 16 is operating in the motoring mode or the generating mode, as well as a means used to control the rotational velocity of sun gear shaft 52 by controlling voltages and currents in the motor/generator 16. The controller determines the operating mode and the desired rotational direction and velocity of the sun gear shaft 52 based on input signals which can include engine state (i.e., off, cranking, or running), rotational velocity of engine crankshaft 72, rotational velocity of carrier shaft 46, rotational velocity of sun gear shaft 52, rotational velocity of ring gear shaft 62, state (i.e., engaged or disengaged) of clutch 36, and state (i.e., engaged or disengaged) of one-way clutch 38. In other exemplary embodiments, the controller can utilize other input signals, to optimize the performance of the power distribution system. These other signals can include signals utilized in controlling engine operations (e.g., signal utilized by an engine control module (ECM)).

When an output power level of the engine is greater than an input power level for driving the vehicle and for operating the accessory drive system, the controller establishes the motor/generator 16 in generating mode. Further, the controller controls the operation of the motor/generator such that the rotational velocity of sun gear shaft 52 is maintained at a desired level (e.g., a rotational velocity that operates the accessories with the highest level of energy efficiency while providing adequate function.)

When the motor/generator 16 is in motoring mode, the motor/generator 16 receives electrical power from the batteries. The current supplied by the batteries can power the motor to rotate sun gear shaft 52. The controller can control electrical power and thereby control the rotational velocity of the sun gear shaft. By controlling the rotational velocity of the sun gear shaft, the controller can control the amount of power being supplied to the power distribution apparatus 12 in excess of the power supplied by the engine 14, and thereby control the rotational velocity of the ring gear shaft 62 driving the accessory drive system 18.

The input power level for operating the accessory drive system can vary during the operation of the accessory drive system based on which accessories are being operated and the power level used by each accessory being operated. For example, the input power level can include power levels from 0.1 horsepower to 10 horsepower. A sensor can detect an operating speed of the accessory drive system and send a signal indicative of the accessory drive system speed to the controller. Alternatively, accessory drive system speed is known from engine output (e.g. crankshaft) speed, motor speed (e.g. phase control signals) and the known gear ratio relationships among the ring, sun and planetary gears. The controller can then change the power input level or the power output level of the motor/generator to maintain the accessory drive system's rotational velocity as the power demand of the accessories change.

The accessory drive system 18 includes an accessory drive pulley 80, a first accessory 82, a second accessory 84, a first accessory pulley 86, a second accessory pulley 88, and a belt 90.

The accessory drive pulley 80 is coupled to the ring gear shaft 62 such that the accessory drive pulley 80 rotates along with the ring gear shaft 62. The accessory drive pulley 80 is operably coupled to the first accessory pulley 86 and the second accessory pulley 88 through the belt 90 such that rotational power is transferred between the accessory drive pulley 80 and accessory pulleys 86 and 88.

The first accessory 82 and second accessory 84 can each be any one of various types of vehicle accessories including an air conditioner system, a power steering system, a power braking system, alternators, and pumps (e.g., water pumps, oil pump, coolant pump and the like), and like accessories. Although exemplary accessory drive system 18 includes two accessories 80 and 82, it is to be understood that exemplary accessory drive system 18 can comprise only one accessory or more than two accessories. In another exemplary embodiment, the accessory drive system includes an air conditioner system, a power steering system, a power braking system, an oil pump, and a coolant pump. The accessory 82 comprises a shaft configured to receive rotational power from the first accessory pulley 86, and the second accessory 84 comprises a shaft configured to receive rotational power from the second accessory pulley 88.

As mentioned previously, the power distribution system 12 can distribute power differently under different operating conditions to maximize the vehicle's energy efficiency. Further, the power distribution system 12 can route power to the accessories from the engine, from the motor/generator, or from both the engine and the motor/generator depending on various operating conditions. Further, the power distribution system can route power from the engine to the motor/generator (e.g., for battery charging), or the power distribution system can route power from the motor/generator to the engine (e.g., to crank the engine). Further, the vehicle can control power distribution such that the accessory pulley rotates at a constant velocity such that power can be efficiently transferred to the vehicle accessories during various vehicle operating conditions. Operating modes of the power distribution system are shown in Table 1. In Table 1, MG stands for motor/generator 16 and PTM stands for power transfer member.

TABLE 1

| Operating Mode | Velocity of Accessory PTM 34 | Velocity of Engine PTM 30 | Velocity of Motor/generator PTM 32 | Clutch 38 | Clutch 36 |
| --- | --- | --- | --- | --- | --- |
| 1. Engine off/ MG driving accessory | =Selected Velocity Level | Off | Motoring - reverse rotation | On | Off |

TABLE 1-continued

| Operating Mode | Velocity of Accessory PTM 34 | Velocity of Engine PTM 30 | Velocity of Motor/generator PTM 32 | Clutch 38 | Clutch 36 |
|---|---|---|---|---|---|
| 2. Low engine velocity/engine & MG driving accessory | =Selected Velocity Level | On (Low speed) | Motoring - reverse rotation | Off | Off |
| 3. Medium engine velocity/engine driving accessory | =Selected Velocity Level | On (Medium speed) | Generating - forward rotation | Off | Off |
| 4. High engine velocity/engine driving accessory | =Selected Velocity Level | On (High speed) | Generating - forward rotation | Off | Off |
| 5. High engine velocity/engine driving accessory & MG | =Engine Velocity | On (High speed) | Off - forward rotation | Off | On |
| 6. Engine off/MG cranking engine | =Engine Velocity | Off | Motoring | Off | On |

In operating mode 1, the engine is off and the motor/generator provides power to the accessories. Clutch 38 is engaged such that rotational power from the motor/generator cannot be transferred to the engine thereby preventing the engine from being operated in the first (backwards) direction. Clutch 36 is disengaged to allow power to be transferred between the motor/generator and the accessory drive system utilizing a selected gear ratio in the power distribution apparatus 12.

In operating mode 2, the engine operates at a low speed and the engine and motor/generator provide power to the accessories. Clutch 38 is disengaged. Clutch 36 is disengaged to allow power to be transferred between the motor/generator and the accessory drive system utilizing a selected gear ratio in the power distribution apparatus 12.

In operating mode 3, the engine operates at a medium speed and the engine provides power to the accessories. Further, part of the rotational power produced by the engine is transferred to the motor/generator and is converted to electrical current. The electrical current is used by the vehicle loads or stored in the batteries. Clutch 38 is disengaged. Clutch 36 is disengaged to allow power to be transferred between the motor/generator and the accessory drive system utilizing a selected gear ratio in the power distribution apparatus 12. In this mode, accessory speed is controlled greater than engine speed.

In operating mode 4, the engine is at a high speed and the engine provides power to the accessories. Further, part of the rotational power produced by the engine is transferred to the motor/generator and is converted to electrical current. The electrical current is used by the vehicle loads or stored in the batteries. Clutch 38 is disengaged. Clutch 36 is disengaged to allow power to be transferred between the motor/generator and the accessory drive system utilizing a selected gear ratio in the power distribution apparatus 12. In this mode, accessory speed is controlled less than engine speed.

In operating mode 5, the engine provides power to the accessories. Further, the motor/generator may be controlled to be either free-wheeling (i.e., neither motoring nor generating) or generating. Clutch 38 is disengaged. Clutch 36 is engaged to lock the planetary gear set and cause the ring gear shaft 62, carrier shaft 46 and sun gear shaft 52 to rotate in unison, allowing power to be transferred from the engine to the motor/generator and the accessory drive system.

In operating mode 6, the engine is initially turned off, and the motor/generator is utilized to start the engine. The apparatus 12 transfers rotational power from the motor/generator to the engine. The engine is rotated at a selected speed prior to initiation of internal combustion. Clutch 36 is engaged so that the gear ratio between the sun gear, the carrier, and the ring gear is 1:1:1 thereby driving the engine at a selected crank velocity. The apparatus 12 also transfers power from the motor/generator to the accessory drive system to power the accessories.

Figure 2:
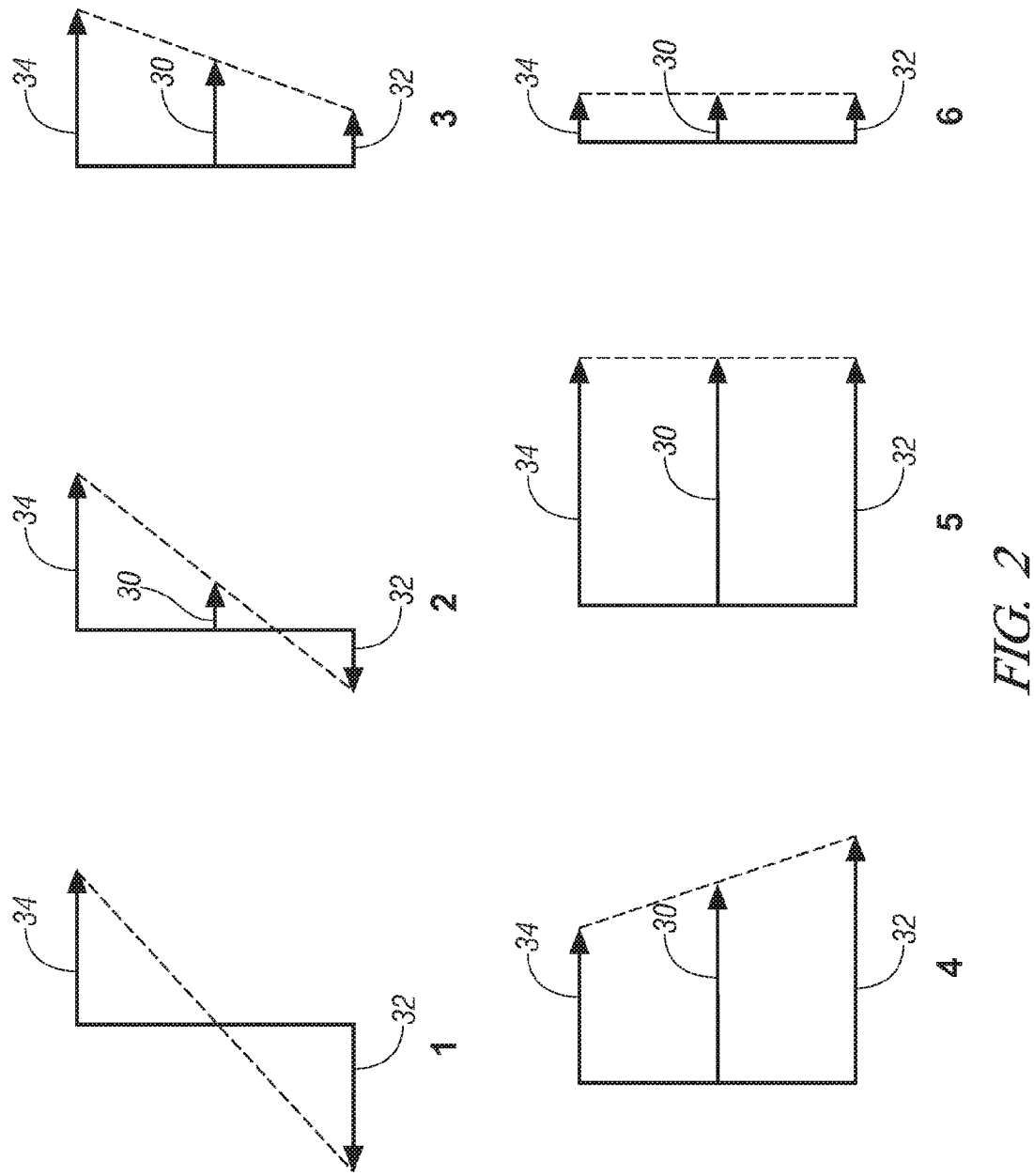
FIG. 2 is a stick and lever diagram depicting the relative velocities of an engine power transfer member, a motor/generator power transfer member, and an accessory power transfer member, of a power transfer apparatus of the power transfer system of FIG. 1.

Referring to FIG. 2, a lever diagram depicts the relative velocities of the engine power transfer member 30, the motor/generator power transfer member 32, the accessory power transfer member 34. The tooth ratio between the ring gear and the sun gear is 1.6:1. In operating modes 1-4 and 6 the accessories drive system operates at a speed controlled by the motor/generator. The controller receives a signal indicative of engine speed or a signal indicative of accessory drive speed and controls the motor/generator to maintain the accessory drive system at the selected speed. The selected accessory drive system speed can be selected so that the accessories can operate with optimal energy efficiency. In an exemplary embodiment, the selected speed is about 500-7000 revolutions per minute, more specifically about 1000-3000 revolutions per minute, and still more specifically about 1500 revolutions per minute. One skilled in the art will recognize that the differential (planetary) transmission arrangement and tooth ratios of the gear sets can be suitably selected to match specific applications.

Now referring to FIGS. 1 and 3-7, exemplary power generation systems 10, 100, 120, 140, 150, and 160 are shown. As summarized in Table 2 below, a planetary gear system can deliver power between the accessories, the engine, and the motor/generator, utilizing various configurations. The configuration can be selected to optimize torque transfer between components and/or to optimize space inside the vehicle. Exemplary tooth ratios are given for the ring to sun gears in the various configurations.

TABLE 2

| Figure (Sample Ring/Sun tooth ratio) | Accessory | Engine | Motor/ Generator | Clutch 2 | Clutch 1 |
|---|---|---|---|---|---|
| 1 (R/S = 1.6) | Ring | Carrier | Sun | Carrier | Ring-Carrier |
| 3 (R/S = 1.6) | Sun | Carrier | Ring | Carrier | Sun-Carrier |
| 4 (R/S = 2.6) | Carrier | Ring | Sun | Ring | Ring-Carrier |
| 5 (R/S = 1.6) | Ring | Carrier | Sun | Carrier | Ring-Carrier |
| 6 (R/S = 1.6) | Sun | Carrier | Ring | Carrier | Sun-Carrier |
| 7 (R1/S1 = 1.6, R2/S2 = 2.0) | Ring | Carrier | Sun | Carrier | Ring-Carrier |

Figure 3:
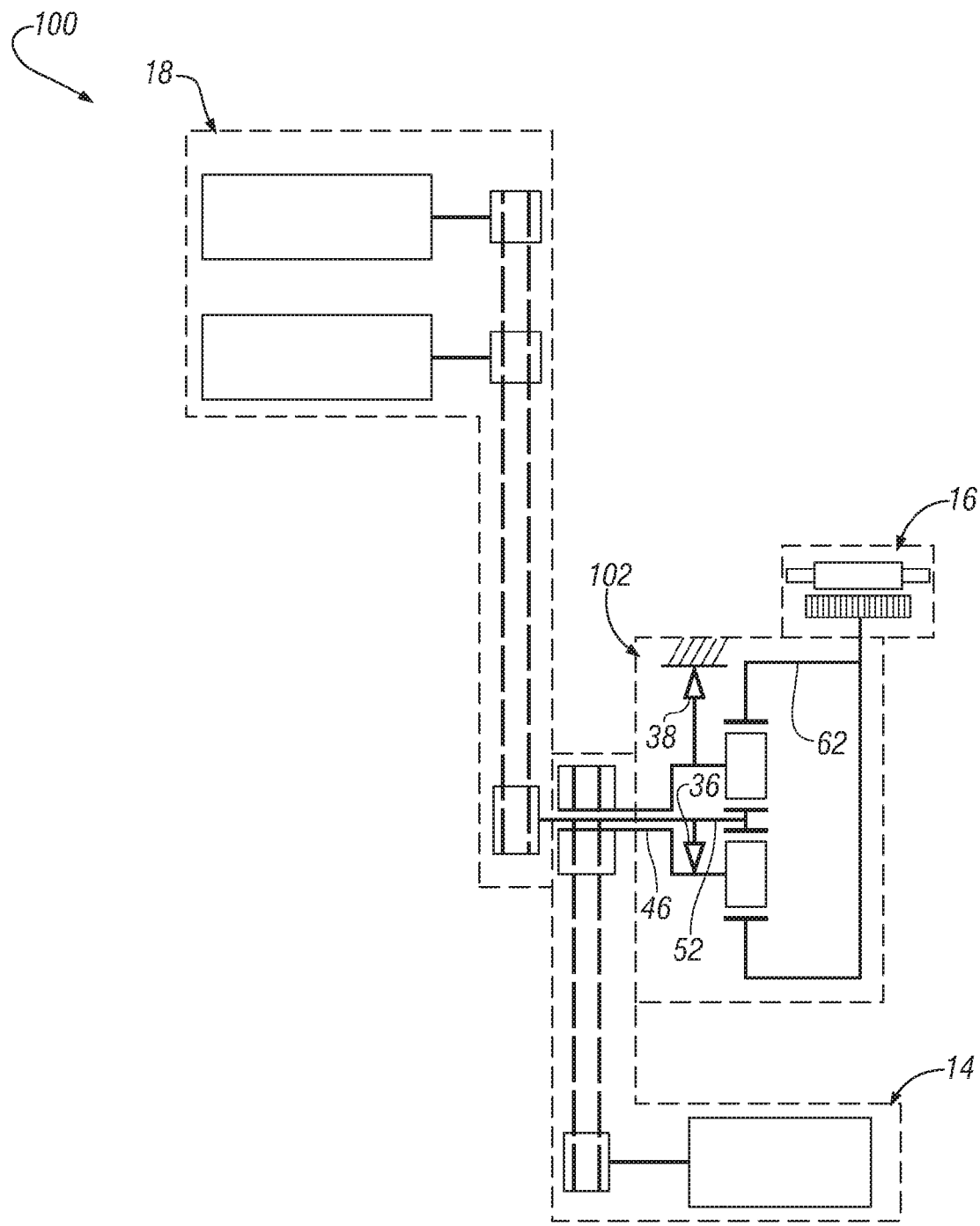
FIG. 3 is a schematic representation of another power transfer system in accordance with another exemplary embodiment.

Referring to FIG. 3, an exemplary embodiment of a power distribution system 100 is shown. The power distribution system 100 includes a power distribution apparatus 102, the engine drive system 14, the motor/generator 16, and the accessory drive system 18.

The power distribution system 102 is a planetary gear system comprising a sun gear, a sun gear shaft 52, a planet gear carrier, a carrier shaft 46, a ring gear, and a ring gear shaft 62. The sun gear shaft 52 is coupled to the accessory drive system through an accessory drive pulley. The planetary gear carrier shaft 46 is coupled to the engine drive system through an engine drive system pulley. The ring gear is coupled to the motor/generator through ring gear shaft 62. This power distribution system arrangement allows the motor/generator speed during high engine speed operation to be lower than that for power distribution system 10.

Figure 4:
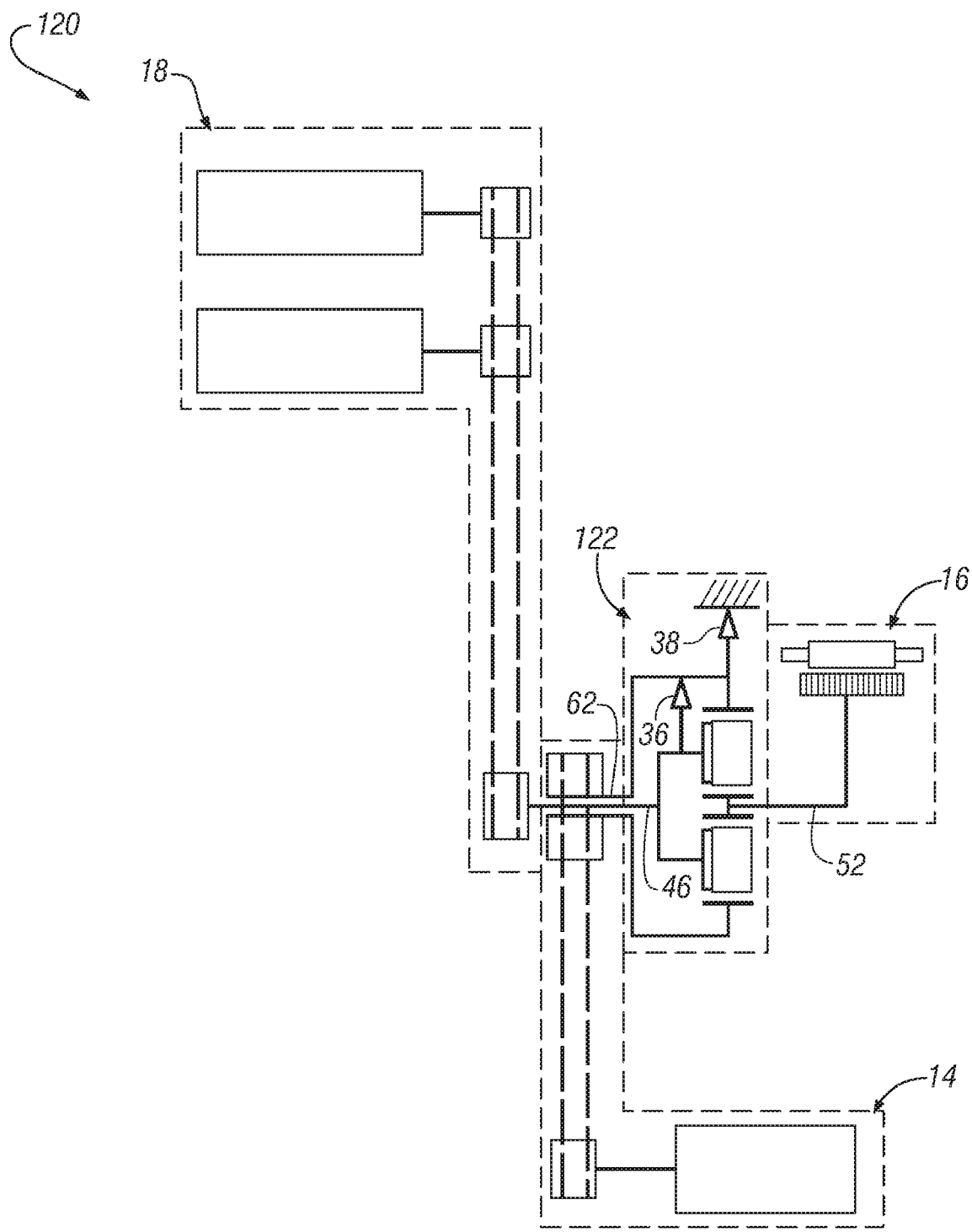
FIG. 4 is a schematic representation of another power transfer system in accordance with another exemplary embodiment.

Referring to FIG. 4, an exemplary embodiment of a power distribution system 120 is shown. The power distribution system 120 includes a power distribution apparatus 122, the engine drive system 14, the motor/generator 16, and the accessory drive system 18.

The power distribution apparatus 122 includes a planetary gear system comprising a sun gear, a sun gear shaft 52, a planet gear carrier, a carrier shaft 46, a ring gear, and a ring gear shaft 62. The sun gear shaft 52 is coupled to the motor/generator. The planetary gear carrier shaft 46 is coupled to the accessory drive system 18 through an accessory drive system pulley. The ring gear is coupled to the engine drive system through an engine drive system pulley. This power distribution arrangement allows selection of practical gear ratios that yield lower motor/generator speeds during high engine speed operation than power distribution systems 10 and 100.

Figure 5:
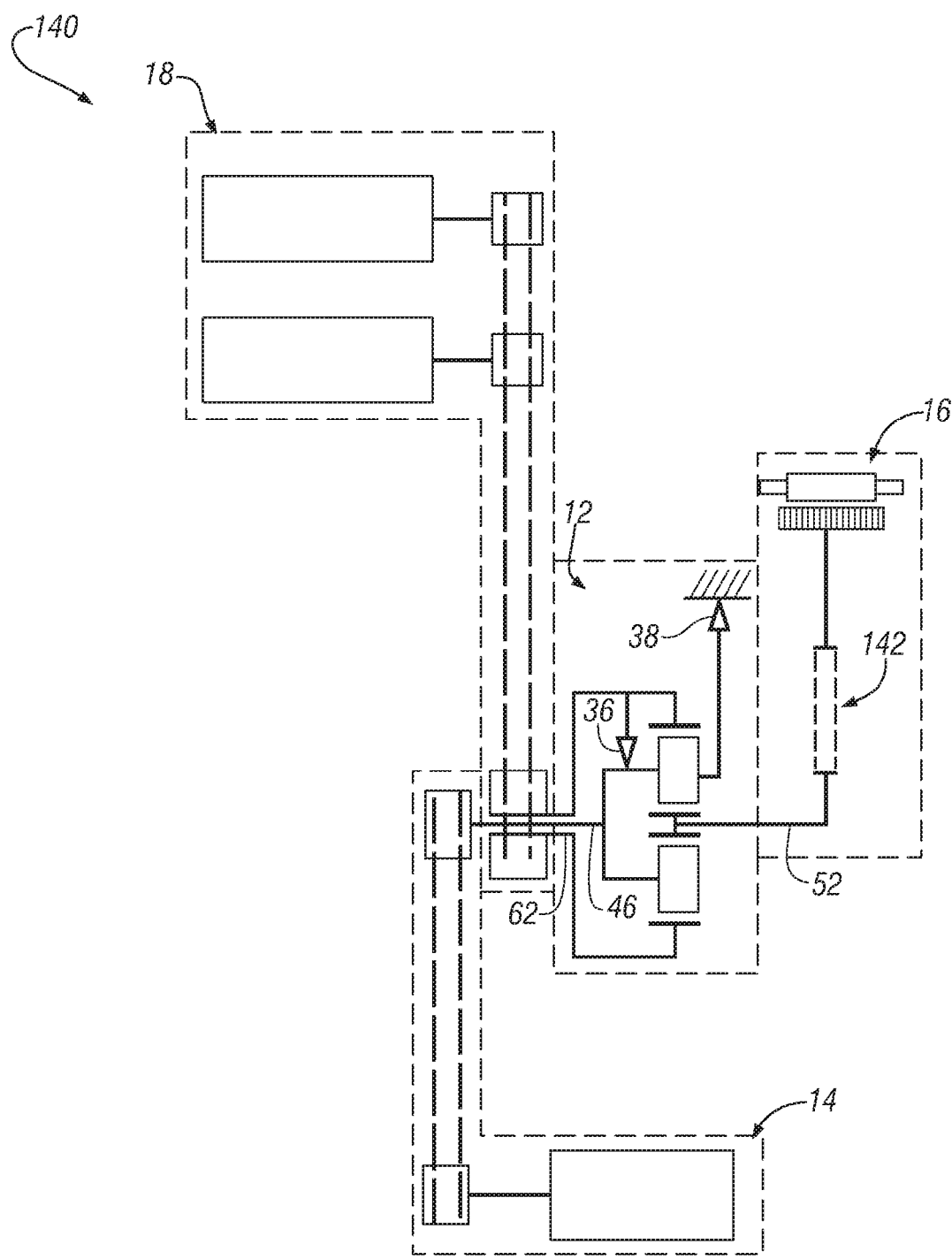
FIG. 5 is a schematic representation of another power transfer system in accordance with another exemplary embodiment.

Referring to FIG. 5, an exemplary embodiment of a power distribution system 140 is shown. The power distribution system 140 comprises the power distribution apparatus 12, the engine drive system 14, the motor/generator 16, and the accessory drive system 18. The power distribution system 140 further comprises a pulley system 142 disposed between the sun gear shaft 52, and a motor/generator shaft. The pulley system 142 is configured to increase or decrease the torque transferred between the motor/generator and the power transfer system.

Figure 6:
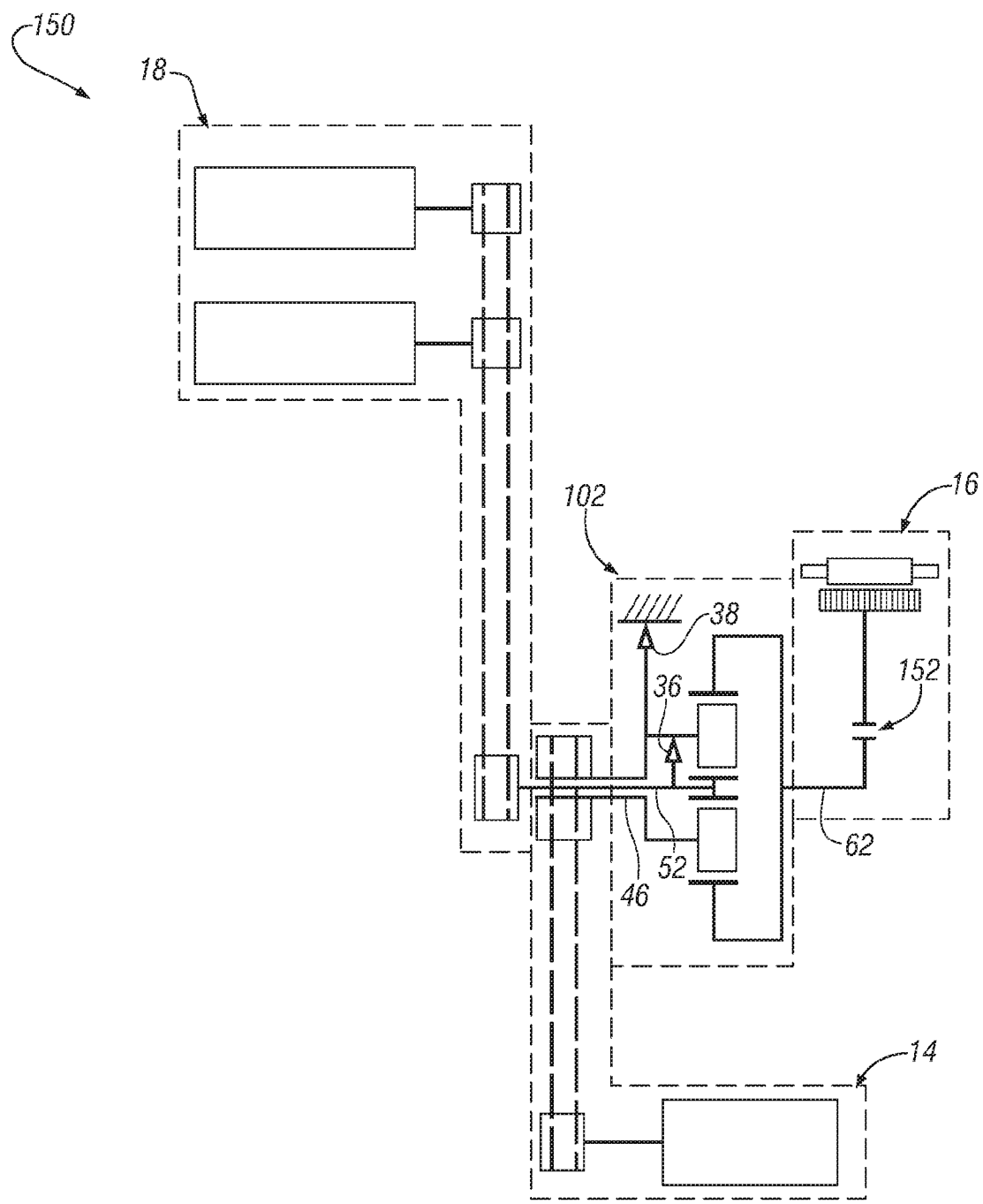
FIG. 6 is a schematic representation of another power transfer system in accordance with another exemplary embodiment.

Referring to FIG. 6, an exemplary embodiment of a power distribution system 150 is shown. The power distribution system 150 comprises the power distribution apparatus 102, the engine drive system 14, the motor/generator 16, and the accessory drive system 18. The power distribution system 150 further comprises a gear system 152 disposed between the ring gear shaft 62, and a motor/generator shaft. The gear system 152 is configured to increase or decrease the torque transferred between the motor/generator and the power transfer system. Although power transfer systems 140 and 150 show torque conversion devices disposed between the motor/generator and the power distribution apparatus, it is to be understood that in other exemplary embodiments, torque devices can be disposed in other locations in a power distribution system (e.g., between the engine and the power distribution apparatus and between the accessory drive system and the power distribution apparatus.)

Figure 7:
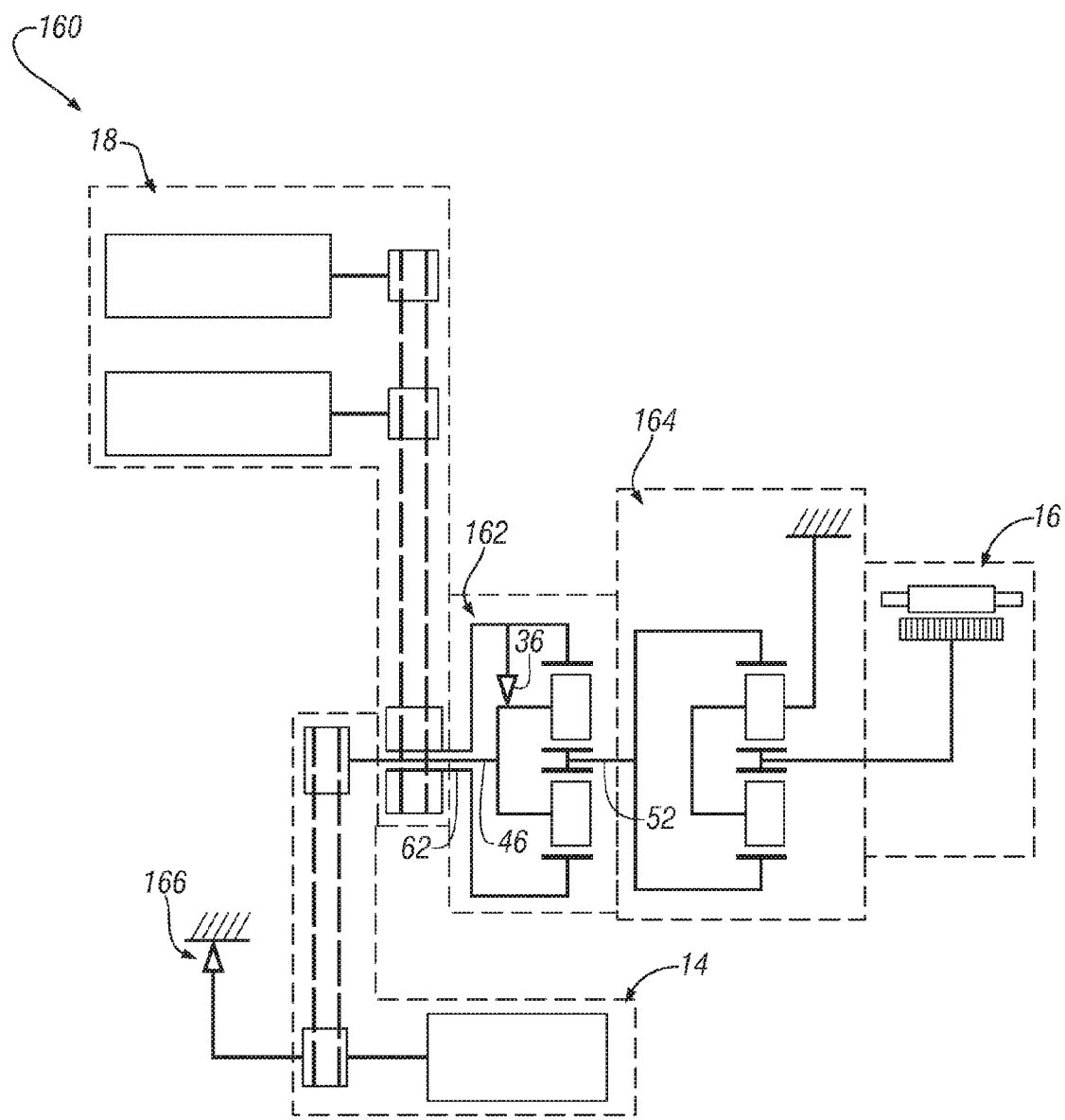
FIG. 7 is a schematic representation of another power transfer system in accordance with another exemplary embodiment.

Referring to FIG. 7, an exemplary embodiment of a power distribution apparatus 160 is shown. The power distribution system 160 comprises a power distribution apparatus 162, a second planetary gear system 164 configured to increase the torque transferred between the motor/generator and the power transfer system, the engine drive system 14, the motor/generator 16, the accessory drive system 18, and a one-way clutch 166.

The power distribution apparatus 162 is substantially similar to power distribution apparatus 12 of FIG. 5. However, power distribution apparatus 162 does not include the one-way clutch 38. Instead, a one-way clutch 166 is selectively coupled to the engine drive pulley 78 of the engine drive system 14. When engaged, the one-way clutch 166 allows the rotation of the engine drive pulley 78 in a second direction, while preventing the rotation of the engine drive pulley 78 in a first direction. The one-way clutch 166 thereby only allows the crankshaft 72 to rotate in the second direction, while preventing the rotation of crankshaft 72 in the first direction. Although clutch 166 is described as a "one-way" clutch it is to be understood that in alternative exemplary embodiments, clutch 166 could be also be a two-way clutch, wherein the two-way clutch is engaged during selected operational conditions to prevent the rotation of the crankshaft 72 in the second direction.

While various exemplary embodiments have been presented in the foregoing detailed description of the invention, it should be appreciated that a vast number of other variations exist. It should also be appreciated that the exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

The invention claimed is:

1. A power distribution system for a hybrid vehicle having an engine, the power distribution system comprising:
    an electric motor/generator;
    a vehicle accessory drive system comprising a first accessory; and
    a power distribution apparatus in operable communication with the engine, the electric motor/generator, and the vehicle accessory drive system, the power distribution apparatus comprising:
        a first power transfer member comprising a first shaft, the first shaft being configured to transfer power to the engine and from the engine;
        a second power transfer member comprising a second shaft, the second shaft being configured to transfer power to the motor/generator and from the motor/generator;
        a third power transfer member comprising a third shaft, the third shaft being configured to transfer power to the accessory drive system to drive the first accessory; and
        a first clutch configured to rotationally couple any two of the first shaft, the second shaft, and the third shaft;
    wherein the electric motor/generator, the engine, or a combination of the electric motor/generator and the engine, can supply power through the power distribution apparatus to the accessory drive system, and
    wherein the third shaft of the power distribution apparatus is configured to operate at a predetermined velocity during multiple vehicle operating modes, wherein the predetermined velocity is controlled by the motor/generator and is independent of the motor/generator operation and is independent of the engine velocity.

2. The power distribution system of claim 1, wherein the vehicle accessory drive system further comprises a second vehicle accessory.

3. The power distribution system of claim 2, wherein power is delivered to the first and second vehicle accessories through pulleys operably communicating with a belt, the belt receiving power from the third shaft.

4. The power distribution system of claim 1, wherein the first accessory comprises an air conditioner system, a power steering system, a power braking system, an oil pump, or a coolant pump.

5. The power distribution system of claim 1, wherein the third shaft is configured to rotate at a velocity of from 500 to 6,000 revolutions per minute when the engine operates at a velocity of from 0 to 7,000 revolutions per minute.

6. The power distribution system of claim 1, wherein the power distribution apparatus comprises a first planetary gear system.

7. The power distribution system of claim 6, wherein the first power transfer member comprises a planet gear carrier, the second power transfer member comprises a sun gear, and the third power transfer member comprises a ring gear.

8. The power distribution system of claim 7, further comprising a second planetary gear system configured to change a torque level between the motor/generator and the second power transfer member of the power distribution apparatus, the second planetary gear system comprising a second ring gear continuously connected to the second shaft, and a second sun gear continuously connected to a fourth shaft, the fourth shaft being configured to transfer power to and from the electric motor/generator.

9. The power distribution system of claim 7, wherein the ring gear to the sun gear tooth ratio is from about 1.5 to about 3.0:1.

10. The power distribution system of claim 6, wherein the first power transfer member comprises a ring gear, the second power transfer member comprises a sun gear, and the third power transfer member comprises a planet gear carrier.

11. The power distribution system of claim 1, wherein a first torque conversion device is disposed between the power distribution apparatus and the engine, the motor/generator, or the accessory drive system.

12. The power distribution system of claim 11, wherein a second torque conversion device is disposed between the power distribution apparatus and the engine, the motor/generator, or the accessory drive system.

13. The power distribution system of claim 11, wherein the torque conversion device comprises a gear system.

14. The power distribution system of claim 11, wherein the torque conversion device comprises a second planetary gear system.

15. The power distribution system of claim 11, wherein the torque conversion device comprises a belt and pulley system.

16. A power distribution system for a hybrid vehicle having an engine, the power distribution system comprising:
an electric motor/generator;
a vehicle accessory drive system comprising a first accessory; and
a power distribution apparatus in operable communication with the engine, the electric motor/generator, and the vehicle accessory drive system, the power distribution apparatus comprising:
a first power transfer member comprising a first shaft, the first shaft being configured to transfer power to the engine and from the engine;
a second power transfer member comprising a second shaft, the second shaft being configured to transfer power to the motor/generator and from the motor/generator;
a third power transfer member comprising a third shaft, the third shaft being configured to transfer power to the accessory drive system to drive the first accessory; and
a first clutch configured to rotationally couple any two of the first shaft, the second shaft, and the third shaft;
a second clutch configured to prevent power from being transferred from the power distribution apparatus to the engine in a first direction;
wherein the electric motor/generator, the engine, or a combination of the electric motor/generator and the engine, can supply power through the power distribution apparatus to the accessory drive system, and
wherein the third shaft of the power distribution apparatus is configured to operate at a predetermined velocity, wherein the predetermined velocity is independent of the engine velocity.

17. The power distribution system of claim 16, wherein the second clutch is configured to engage the first power transfer member to prevent power transfer to the engine in the first direction.

18. The power distribution system of claim 1, wherein power is transferred to the accessory drive system at a predetermined power level of 0.1 horsepower to 10 horsepower.

* * * * *